United States Patent
Iwase et al.

[11] Patent Number: 6,007,936
[45] Date of Patent: *Dec. 28, 1999

[54] BATTERY

[75] Inventors: Akira Iwase; Tadahiro Tokumoto, both of Hirakata; Kenichi Aoki, Fujisawa; Gota Asano, Yokohama; Norio Suzuki, Chigasaki, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,293

[22] Filed: Feb. 7, 1997

[30] Foreign Application Priority Data

Feb. 8, 1996 [JP] Japan .................................. 8-022268

[51] Int. Cl.⁶ .................................................. H01M 2/26
[52] U.S. Cl. ................................................ 429/94; 429/164
[58] Field of Search ............................... 429/94, 163, 164

[56] References Cited

U.S. PATENT DOCUMENTS

| | | | |
|---|---|---|---|
| 3,081,367 | 3/1963 | Field et al. | 429/94 |
| 4,255,500 | 3/1981 | Hooke | 429/94 |
| 4,259,416 | 3/1981 | Hueda et al. | 429/94 |
| 4,553,419 | 11/1985 | Goodman . | |
| 4,929,519 | 5/1990 | Catotti | 429/94 |

FOREIGN PATENT DOCUMENTS

| | | |
|---|---|---|
| 30 11 563 | 10/1980 | Germany . |
| 60-180058 | 9/1985 | Japan . |
| 61-101951 | 5/1986 | Japan . |
| 03254074 | 11/1991 | Japan . |
| 04160763 | 6/1992 | Japan . |
| 61-50973 | 5/1994 | Japan . |
| 7-99686 | 10/1995 | Japan . |

*Primary Examiner*—Stephen Kalafut
*Attorney, Agent, or Firm*—Ratner & Prestia

[57] ABSTRACT

A battery having a stable internal resistance with a small deviation of internal resistance, and capable of suppressing a change or elevation of internal resistance due to external impact is provided. The battery comprises a battery can having a conductivity, serving also as a negative terminal, and including an opening, a spiral electrode group disposed in the battery can, a positive plate and a negative plate wound around a separator, an electrolyte member disposed in the battery can, and a sealing member serving also as a positive terminal, disposed in the opening of the battery can through an electric insulating member. In the inner wall of the battery can, contacting with the negative electrode positioned on the outermost circumference of the plate group, plural linear bumps vertical to the bottom of the battery can are formed. The height of each linear bump of the plural linear bumps ranges from 0.05 mm to 0.25 mm, and the pitch of the linear bumps ranges from 0.5 mm to 10 mm. The negative electrode member comprises a metal core and a negative electrode material covering the surface of the metal core, and linear bumps are formed on the inner surface of the battery can, and the bumps are contact the surface of the negative electrode material.

10 Claims, 3 Drawing Sheets

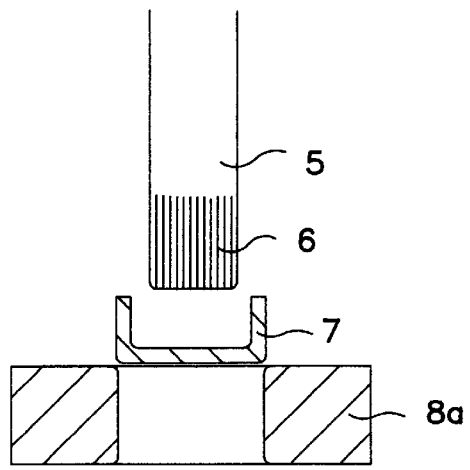
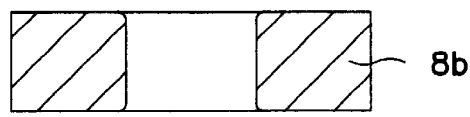
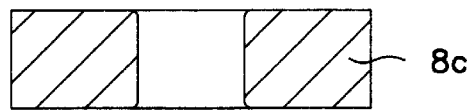
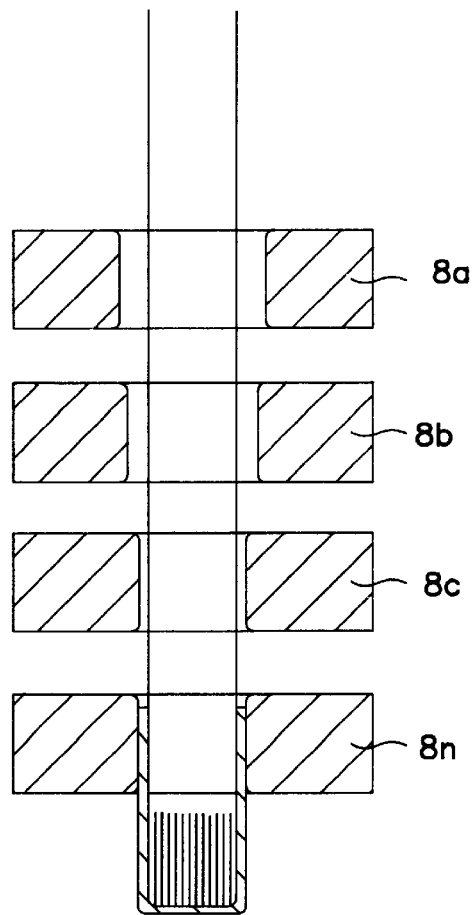
FIG. 3(A)	FIG. 3(B)

he_

BATTERY

FIELD OF THE INVENTION

The present invention relates to a battery can for storing a spiral plate group of a battery, and in particular, an enclosed type alkaline storage battery.

BACKGROUND OF THE INVENTION

Recently, with the rapid progress in portable and cordless appliances, there is a mounting demand for a secondary battery having a small size and light weight and having a high energy density that can be used as the power source of these appliances. In particular, based on the lithium secondary battery and nickel-hydrogen storage battery, many new products have been developed. Moreover, in the nickel-cadmium storage battery which is low in cost and high in reliability, further enhancement of its characteristics is desired.

A conventional nickel-cadmium battery is composed of a battery can, a plate group contained in the battery can, and an electrolytic member. The inner wall of the battery can is a smooth surface, so that the spiral plate group can be inserted easily. The plate group comprises a positive plate, a negative plate, and a separator. The plate group is spiral, and the negative plate is positioned on the outermost circumference, and this negative plate contacts with the inner wall of the battery can. That is, the battery can serves also as the negative terminal. The plate group is only wound, and the lead of the negative plate is not spot-welded or bonded to the bottom of the battery can. In this structure, therefore, since the inner wall of the battery can confronting the outermost circumference of the negative plate is a smooth surface, the negative plate and battery can only contact with each other, and the contact pressure is small, and hence the internal resistance of the battery is often increased. Moreover, the plate group is likely to be moved by an external impact, and the internal resistance is not stabilized. As a result, when the internal resistance is large, sufficient charging or discharging cannot be conducted.

To reduce the internal resistance of an alkaline manganese battery, in Japanese Patent Publication No. 7-99686, it is proposed to form fine vertical stripes on the inner surface of the can. However, in the case of the alkaline manganese battery in which the positive electrode compound directly contacts the inner surface of the can, it is effective to form vertical stripes at a protrusion height of 0.005 to 0.02 mm and a stripe pitch of 0.002 to 0.4 mm as disclosed therein. However, in the case of a battery in which contact between the negative plate and the inner wall of the battery can is desirably maintained only by inserting a spiral plate group, composed by winding a positive plate and a negative plate around a separator, into the battery can, a negative compound material having a high resistance value is interposed between the negative plate on the outermost circumference of the spiral plate group and the inner surface of the battery can. Accordingly, if the vertical stripe pitch is less than 0.4 mm, the contact surface area of both the battery can and the negative electrode material is increased, but the material resistance of the negative electrode material is high, and hence the effect for reducing the internal resistance of the battery and the effect for suppressing changes of internal resistance due to external impact are small.

SUMMARY OF THE INVENTION

An exemplary battery of the present invention comprises a battery can having a conductivity, the battery can serving also as a negative terminal, and including an opening, an electrode group disposed in the battery can, an electrolyte member disposed in the battery can, and a sealing member serving also as a positive terminal, disposed in the opening of the battery can through an electric insulating member. The electrode group includes a positive electrode member, a negative electrode member, and a separator disposed between the positive electrode member and the negative electrode member. The electrode group is wound and disposed in a spiral state so that the negative electrode member may be positioned at the outside and that the positive electrode member may be positioned at the inside. The negative electrode member has a metal core and a negative electrode material covering the surface of the metal core. A part of the positive electrode member electrically conducts with the sealing member. Plural bumps are formed inside the battery can. The plural bumps are disposed in a contacting state while pressurizing the negative electrode member positioned on the outermost circumference of the electrode group in a spiral state, and each bump of the plural bumps is disposed to cover the surface of the negative electrode member.

In one embodiment, preferably, the battery can is a cylindrical battery can. Preferably, the plural bumps are plural linear bumps formed vertically to the bottom of the battery can. Preferably, the pitch between linear bumps of the plural linear bumps ranges from 0.5 mm to 10 mm. Preferably, the height of each linear bump ranges from 0.05 mm to 0.25 mm. Preferably, the conductivity of the negative electrode material is smaller than the conductivity of the metal core.

In the preferred embodiment, the bumps strongly pressurize the surface of the negative electrode member. Thus, the negative electrode member is firmly fixed to the bumps of the battery can. If an external impact is given, the plate group is not deviated and moved, so that a change or elevation of internal resistance is desirably suppressed. By the pressurizing force, the bumps deeply bite into the negative electrode material having a conductivity and covering the surface of the negative electrode member. Alternatively, the bumps compress the negative electrode material having a conductivity and covering the surface of the negative electrode member. Accordingly, the deviation of the internal resistance value is small, and a stable internal resistance is obtained. Moreover, the distance between the metal core and the bumps composed inside of the negative electrode member is shortened. As a result, the resistance between the negative electrode member and the bumps as negative terminals is reduced, and the internal resistance becomes smaller.

Moreover, when the thickness of the material plate of the battery can and the outside diameter of the battery can are constant, the above effects are obtained without lowering the effective capacity in the battery can. Thus, while maintaining a high capacity in a limited outer shape of small internal resistance, a battery having an excellent reliability, without a significant change in the resistance due to external impact, is obtained.

BRIEF DESCRIPTION OF THE DRAWINGS

FIGS. 3(A) and 3(B) are sectional views explaining the processing method of a battery can used in a battery according to a further embodiment of the invention.

REFERENCE NUMERALS

Figure 1:
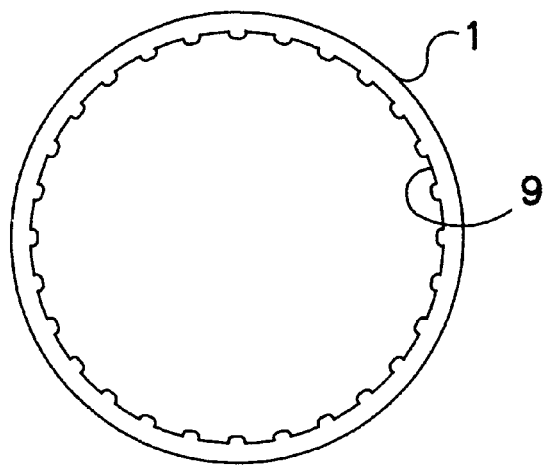
FIG. 1 is a horizontal sectional view of a battery can according to an embodiment of the invention.

1 Battery can
2 Positive member
3 Negative member
4 Separator
5 Punch
6 Punch groove
7 Cup-shaped metal material
8 Drawing and ironing die
9 Linear bump

DETAILED DESCRIPTION OF THE INVENTION

Figure 4:
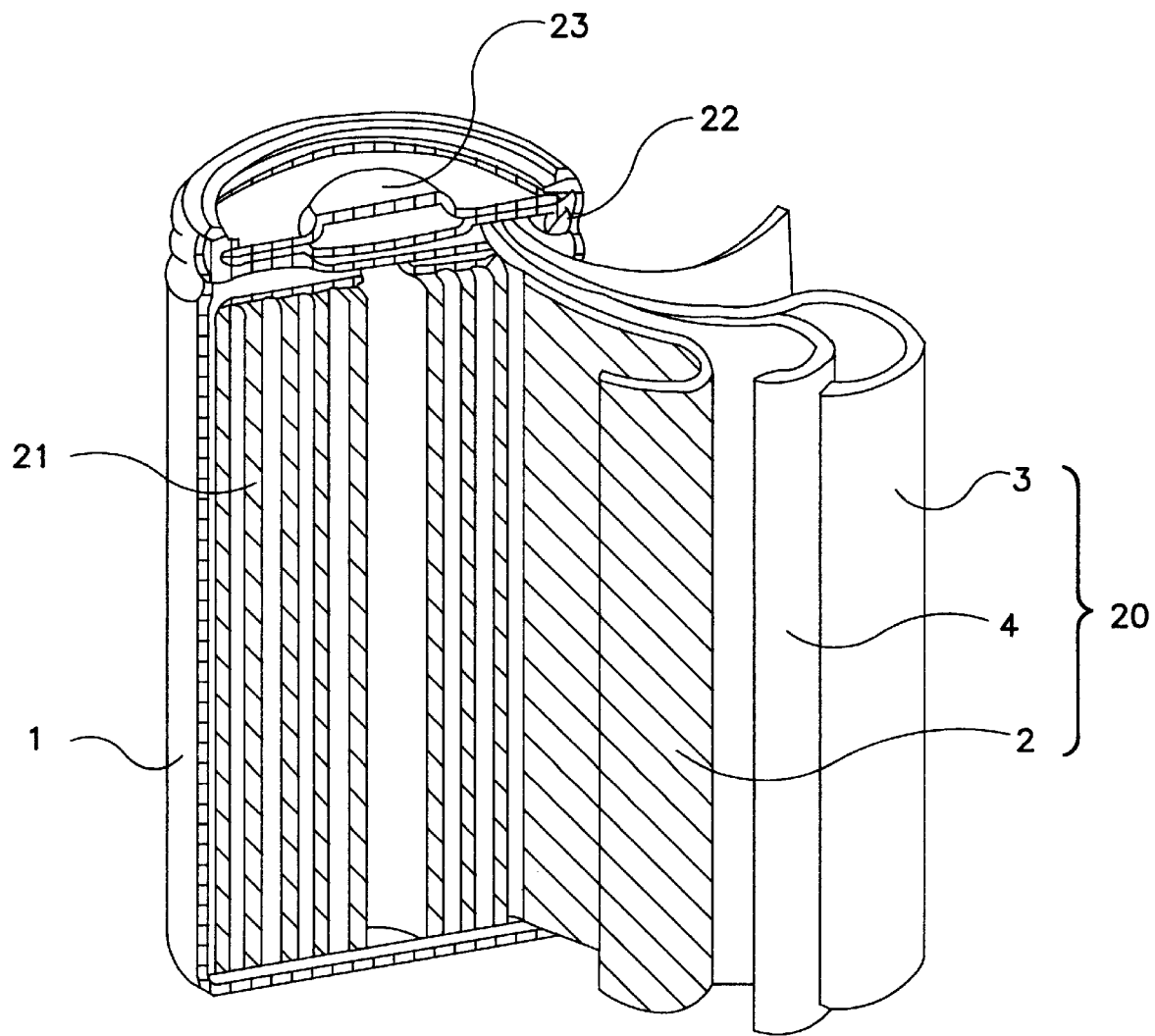
FIG. 4 is a perspective view showing a structure of a battery according to a further embodiment of the invention.

A perspective view of a battery according to an exemplary embodiment of the invention is shown in FIG. 4. In FIG. 4, the battery is composed of a battery can 1, an electrode plate group 20 contained in the battery can 1, an electrolyte member 21 immersed in the electrode group 20, and a metal sealing plate 23 disposed to seal the opening of the battery can 1. The plate group 20 includes a positive electrode member 2, a negative electrode member 3, and a separator 4 disposed between the positive electrode member 2 and negative electrode member 3. The plate group 20 is wound in a spiral form, and the negative electrode member 3 is disposed on the outer circumference side and the positive electrode member 2 on the inner circumference side thereof. The negative electrode member 3 is composed of a metal core and a negative electrode material covering the surface of the core. The positive electrode member 2, negative electrode member 3, and separator 4 are band-shaped sheets or plates, and they are wound spirally.

At the opening of the battery can 1, the metal sealing plate 23 is disposed through an electrical insulating packing 22. The metal sealing plate 23 also serves as a positive terminal. Of the electrode group 20 wound spirally, part of the positive electrode member 2 is electrically connected to the inside of the metal sealing plate 23. Plural linear bumps are formed inside the battery can 1. Of the electrode group 20 wound spirally, the outermost surface of the negative electrode member 3 contacts with the linear bumps of the battery can 1, and an electrical conduction is achieved by this contact.

Figure 2:
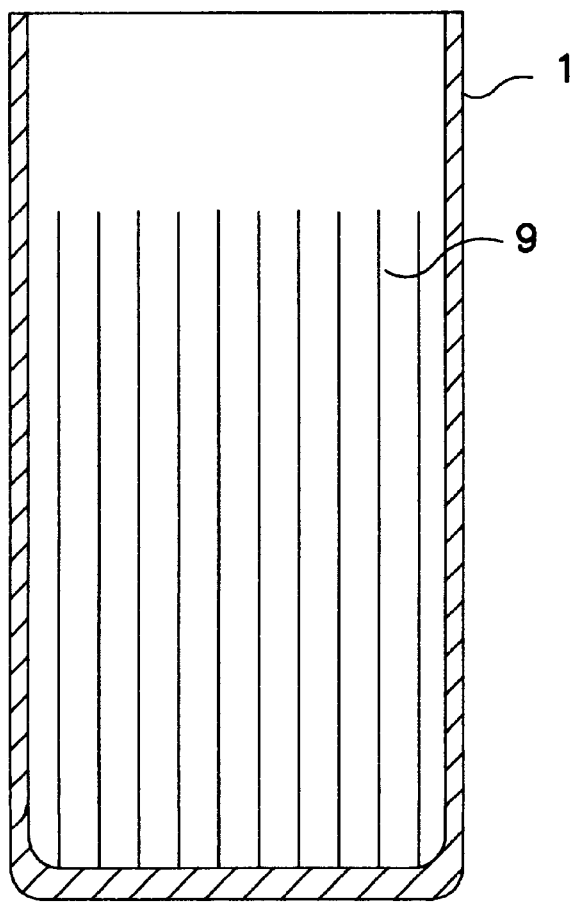
FIG. 2 is a vertical sectional view of a battery can according to an embodiment of the invention.

Exemplary embodiments of the battery can of the present invention are shown in FIG. 1 and FIG. 2. FIG. 1 is a horizontal sectional view of the battery can, and FIG. 2 is a vertical sectional view of the battery can. In FIG. 1 and FIG. 2, the battery can 1 is cylindrical in shape, and plural linear bumps 9 are formed inside the battery can 1.

In the inner wall of the battery can 1, linear bumps 9 are formed vertically at a height of 0.05 to 0.25 mm from the bottom of the battery can and at a pitch of 0.5 to 10 mm.

The battery can is preferably fabricated by drawing and ironing (DI) technology shown in FIGS. 3(A) and 3(B). A groove 6 having a depth corresponding to the desired height of the bumps is formed at the leading end of a punch 5 parallel to the axial line of the punch. The punch 5 is abutted against a metal material 7 preliminarily formed in a cup shape of nickelplated iron plate. The drawing and ironing dies 8a to 8n having an outer pattern are passed sequentially. The die having a drawing and ironing diameter of the final stage 8n is the desired outside diameter of the battery can 1 and is pressurized by the punch 5. At this time, the can 1 inside is strongly pressed against the punch peripheral surface by the pressurizing force from the die, and vertical stripes are transferred. In this way, a battery can with linear bumps formed on the inner surface of the can is fabricated. In this case, the linear bumps are set in the length of the groove also in the punch so as not to reach the vicinity of the opening of the battery can.

An exemplary fabricated nickel-cadmium storage battery is 16.3 mm in outside diameter of the battery can, and 42.5 mm in height of battery. A 0.45 mm thick nickel-plated iron plate is used for fabricating the battery can. In the DI process, the can bottom is nearly same as the thickness of the plated iron plate being used, but the side surface may be made thinner. In the preferred embodiment, the side thickness is 0.19 mm. The positive electrode member is composed of a core material of foamed nickel board, and an active substance mainly composed of nickel hydroxide is filled in the core material. The negative electrode material is composed of a metal core having a conductivity, and a cadmium compound covers the surface of the core.

In the battery can shown in FIG. 1, a positive plate acting as a positive electrode member and a negative plate acting as a negative electrode member are put in a plate group wound spirally through a separator, and an electrolyte mainly composed of potassium hydroxide (KOH) is injected as the electrode member, and the opening is sealed. Thus, an enclosed nickel-cadmium storage battery of capacity of 1200 mAh is fabricated.

The linear bumps of the battery can have a defined in the height, pitch and length. Using this method, various nickel-cadmium storage batteries were fabricated and the initial internal resistance was measured. Afterwards, the storage battery was dropped on an oak board of 10 mm or more in thickness, from a height of 20 cm, five times in the battery axial direction and five times in the direction vertical to the axial line. The internal resistance after dropping was then measured. Comparing the internal resistance before dropping and after dropping, it has been confirmed that the elevation of the internal resistance was suppressed within 5 mohms or less.

Various battery cans and various batteries may be manufactured by forming linear bumps in various lengths, heights and pitches. In 50 cells of each of the manufactured batteries, the internal resistance was measured after initial charging and discharging, and the internal resistance was measured after the drop test, and the difference of the internal resistance before and after the dropping was calculated.

The initial internal resistance before dropping ranged from about 21 mohms to about 25 mohms. On the other hand, after the dropping test, the internal resistance was as follows.

The internal resistance after the dropping test of the battery using a battery can having a linear bump length of 37 mm, bump pitch of 2.08 mm and bump height of 0.14 mm, ranged from 21 mohms to 26 mohms, or 23 mohms average.

The internal resistance after the dropping test of the battery using a battery can having a linear bump length of 37 mm, bump pitch of 0.33 mm and bump height of 0.03 mm, ranged from 21 mohms to 31 mohms, or 25 mohms average.

The internal resistance after the dropping test of the battery using a battery can having a linear bump length of 37 mm, bump pitch of 16.7 mm and bump height of 0.03 mm, ranged from 23 mohms to 40 mohms, or 27 mohms average.

The internal resistance after the dropping test of the battery using a battery can having a linear bump length of 37 mm, bump pitch of 16.7 mm and bump height of 0.14 mm, ranged from 21 mohms to 29 mohms, or 25 mohms average.

The internal resistance after the dropping test of the battery using a battery can having a linear bump length of 37 mm, bump pitch of 2.08 mm and bump height of 0.03 mm, ranged from 22 mohms to 36 mohms, or 26 mohms average.

The internal resistance after the dropping test of the battery using a battery can having a linear bump length of 37 mm, bump pitch of 0.33 mm and bump height of 0.14 mm, ranged from 21 mohms to 29 mohms, or 25 mohms average.

Thus, when the linear bump pitch was 0.5 mm or less or 10 mm or more, or the linear bump height was 0.05 mm or less, the internal resistance value was not stable, and the deviation tended to be larger.

Results of the difference of internal resistance measurements before and after dropping the various batteries are shown in Table 1, Table 2, and Table 3.

TABLE 1

Linear bump length 37 mm

| | | Bump height (mm) | | | | | | |
|---|---|---|---|---|---|---|---|---|
| | | 0.03 | 0.05 | 0.09 | 0.14 | 0.17 | 0.21 | 0.25 |
| Bump pitch (mm) | 0.33 | 10 | 7 | 7 | 5 | — | — | — |
| | 0.50 | 9 | 3 | ○ | ○ | ○ | ○ | — |
| | 1.04 | 15 | ○ | ○ | ○ | ○ | ○ | ○ |
| | 2.08 | 18 | ○ | ○ | ○ | ○ | ○ | ○ |
| | 5.01 | 13 | ○ | ○ | ○ | ○ | ○ | ○ |
| | 10.0 | 20 | 10 | ○ | ○ | ○ | ○ | ○ |
| | 16.7 | 32 | 9 | 5 | 5 | 1 | 1 | 2 |

TABLE 2

Linear bump length 30 mm

| | | Bump height (mm) | | | | | | |
|---|---|---|---|---|---|---|---|---|
| | | 0.03 | 0.05 | 0.09 | 0.14 | 0.17 | 0.21 | 0.25 |
| Bump pitch (mm) | 0.33 | 14 | 8 | 6 | — | — | — | — |
| | 0.50 | 12 | 2 | ○ | ○ | ○ | ○ | — |
| | 1.04 | 17 | ○ | ○ | ○ | ○ | ○ | ○ |
| | 2.08 | 16 | ○ | ○ | ○ | ○ | ○ | ○ |
| | 5.01 | 11 | ○ | ○ | ○ | ○ | ○ | ○ |
| | 10.0 | 15 | 8 | ○ | ○ | ○ | ○ | ○ |
| | 16.7 | 28 | 10 | 6 | 5 | 2 | 1 | 1 |

TABLE 3

Linear bump length 20 mm

| | | Bump height (mm) | | | | | | |
|---|---|---|---|---|---|---|---|---|
| | | 0.03 | 0.05 | 0.09 | 0.14 | 0.17 | 0.21 | 0.25 |
| Bump pitch (mm) | 0.33 | 9 | 8 | 5 | — | — | — | — |
| | 0.50 | 14 | 2 | ○ | ○ | ○ | ○ | — |
| | 1.04 | 18 | ○ | ○ | ○ | ○ | ○ | ○ |
| | 2.08 | 11 | ○ | ○ | ○ | ○ | ○ | ○ |
| | 5.01 | 11 | ○ | ○ | ○ | ○ | ○ | ○ |
| | 10.0 | 14 | 4 | ○ | ○ | ○ | ○ | ○ |
| | 16.7 | 25 | 7 | 6 | 3 | 2 | 3 | 1 |

In the batteries in Table 1, the linear bump length in the battery can is 37 mm, and the bump height is shown in horizontal lines and the pitch is given in the vertical columns. The "−" mark refers to an item that is not measured, including the case in which the punch could not be manufactured. The "○" mark shows the elevation of internal resistance was within 5 mohms in all 50 cells. The table shows the number of cells of which internal resistance exceeded 5 mohms. In Table 1, since the thickness of the nickel-plated iron plate is 0.45 mm, and the thickness of the formed battery can is 0.19 mm, the bump height does not exceed 0.26 mm. In the case of the pitch being in a range of 0.5 mm to 10.0 mm and a bump height of 0.09 mm or more, all are "○" marked. If the bump height is 0.05 mm, it is "○" depending on the pitch condition.

In Table 2, the length of the linear bumps in the battery can is 30 mm, and in Table 3, the length is 20 mm. Thus, as can be seen from Table 1, Table 2, and Table 3, when forming the linear bumps on the surface in the battery can and forming the bumps so as to bite into or compress the surface of the negative electrode member, it is effective to suppress elevation of internal resistance due to external impact. In particular, an excellent effect is obtained when the linear bumps have a specified pitch and height.

Also from Table 1, Table 2, and Table 3, it can be shown that when the height of the linear bumps is in a range of 0.05 mm to 0.25 mm, and the pitch of linear bumps is in a range of 0.5 mm to 10 mm, the effect of suppressing elevation of internal resistance due to dropping is obtained. When the linear bump height is less than 0.05 mm and the pitch is less than 0.5 mm, the force of pressurizing the negative plate by the linear bumps is weak, and the contact force between the negative plate and linear bumps is weak and the contact resistance is high, so that the effect for suppressing elevation of internal resistance due to dropping is smaller. When the pitch is 10 mm or more, the contact surface area of the negative plate and the linear bumps is small, and the amount of change of contact resistance due to impact from outside is larger, so that the effect of suppressing the elevation of internal resistance due to dropping is smaller.

Moreover, by controlling the thickness of the battery can and the thickness of the nickel-plated pole plate, the height of the linear bumps may be 0.25 mm or more. When the thickness of the battery can is about 0.45 mm, the height of the linear bumps is preferably 0.26 mm or less. If the height of the linear bumps is more than 0.26 mm, the pressurizing force of the negative plate and linear bumps increases, and the effect for suppressing elevation of internal resistance due to dropping also becomes larger. However, as the effect for suppressing elevation of internal loss is saturated, the volume for installing the plate group is decreased.

The shape of the linear bumps is not particularly limited, but a shape that is likely to bite into the negative electrode material is preferred, or a shape that is easy to compress is desired. For example, the sectional shape of the bumps may be an acute triangle, an obtuse triangle, a circle, a semicircle, a trapezoid, or a quadrangle. The conductivity of the negative electrode material for composing the negative electrode member is desired to be smaller than the conductivity of the metal core. In this embodiment, the effect for decreasing the internal resistance is further enhanced.

In the present embodiment, the DI can is presented, but similar effects are obtained in other battery cans such as drawn cans. Also in the present embodiment, a nickel-cadmium storage battery is shown, but similar effects are obtained in other spiral batteries such as a nickel-hydrogen battery and a lithium secondary battery. For the negative electrode material, an example of a cadmium compound is shown, but it is not limited to this. For example, a hydrogen occluded alloy, lithium metal of lithium secondary battery, lithium alloy, or carbon material capable of intercalating lithium may be used. For the positive electrode material, an example of nickel compound is presented, but it is not limited to this. For example, a lithium transition metal of a lithium secondary battery (such as $LiMO_2$, M=Co, Ni, or CoMn) and spinel $LiMO_2O_4$ may be also used.

Thus, according to the present embodiments of the invention, it is possible to obtain a battery simultaneously having various characteristics including small internal resistance, high capacity in a limited external volume, and excellent reliability against external impact.

Although illustrated and described herein with reference to certain specific embodiments, the present invention is nevertheless not intended to be limited to the details shown. Rather, various modifications may be made in the details within the scope and range of equivalence of the claims and without departing from the spirit of the invention.

What is claimed:

1. An enclosed alkaline storage battery comprising:
   a battery can having an opening and a conductivity, said battery can serving as a negative terminal,
   a plurality of linear bumps formed inside said battery can, said plurality of linear bumps formed substantially vertically from a bottom of said battery can,
   an electrode group disposed in said battery can, said electrode group including i) a positive electrode member, ii) a negative electrode member, and iii) a separator disposed between said positive electrode member and said negative electrode member, said negative electrode member including a metal core material and a negative electrode material covering a surface of said metal core material,
   an electrolyte member disposed in said battery can,
   an electric insulating member disposed around said opening of said battery can, and
   a sealing member disposed in said opening of said battery can through said electric insulating member, said sealing member serving as a positive terminal and electrically conductive with part of said positive electrode member,
   wherein said electrode group is wound and disposed in a spiral state so that said negative electrode member is positioned outside of the electrode group and that said positive electrode member is positioned inside of the electrode group, and
   each bump of said plurality of linear bumps i) is disposed in electrical contact with and ii) bites into a surface of said negative electrode material so that said negative electrode material is in a compressed state.

2. A battery of claim 1, wherein said battery can is cylindrical shaped.

3. A battery of claim 1, wherein said plurality of bumps are a plurality of linear bumps formed vertically to the bottom of said battery can, and the pitch between linear bumps of said plurality of linear bumps ranges from 0.5 mm to 10 mm.

4. A battery of claim 1, wherein said plurality of bumps are a plurality of linear bumps formed vertically to the bottom of said battery can, and the height of each linear bump of said plurality of linear bumps ranges from 0.05 mm to 0.25 mm.

5. A battery of claim 1, wherein said battery can is cylindrical shaped, each bump of said plurality of bumps is a linear bump formed vertically to the bottom of said battery can, and the height of each linear bump ranges from 0.05 mm to 0.25 mm.

6. A battery of claim 1, wherein said battery can is cylindrical shaped, said plurality of bumps are a plurality of linear bumps formed vertically to the bottom of said battery can, the pitch between linear bumps of said plurality of linear bumps ranges from 0.5 mm to 10 mm, and the height of each linear bump ranges from 0.05 mm to 0.25 mm.

7. A battery of claim 1, wherein said battery can confronting said electric insulating member is a nearly smooth surface.

8. A battery of claim 1, wherein said metal core material has a conductivity smaller than that of the negative electrode material.

9. A battery comprising:
   a battery can having a conductivity and an opening, said battery can serving as a negative terminal,
   a spiral electrode group comprising a positive plate and a negative plate wound through a separator and disposed in said battery can, said negative plate positioned on an outermost circumference of said spiral electrode group, said negative plate including a metal core material and a negative electrode material covering a surface of said metal core material,
   a plurality of linear bumps formed in the inner wall of said battery can substantially vertical to a bottom of said battery can i) in electrical contact with said negative electrode material, ii) biting into said negative electrode material, and iii) disposing said negative electrode material in a compressed state, wherein a height of each linear bump ranges from 0.05 mm to 0.25 mm and a pitch between the linear bumps ranges from 0.5 mm to 10 mm,
   an electrolyte member disposed in said battery can,
   an electric insulating member disposed around said opening of said battery can, and
   a sealing member disposed in said opening of said battery can through said electric insulating member, said sealing member serving as a positive terminal.

10. A battery comprising:
    a battery can serving as a negative terminal and having an opening,
    a spiral wound electrode group disposed in said battery can comprising a positive electrode member, a negative electrode member, and a separator disposed between said positive electrode member and said negative electrode member, said negative electrode member including a metal core material and a negative electrode material covering a surface of said metal core material,
    a plurality of bumps formed on the inner surface of said battery can and in electrical contact with said negative electrode member, each of said plurality of bumps disposed against a surface of said negative electrode material and biting into said negative electrode member so that said negative electrode material is in a compressing state,
    an electrolyte member disposed in said battery can,
    an electric insulating member disposed around said opening of said battery can, and
    a sealing member serving as a positive terminal disposed in said opening of said battery can through said electric insulating member.

* * * * *